Dec. 3, 1929.  J. A. PRUSSEN  1,738,482
NUT LOCK
Filed May 5, 1928
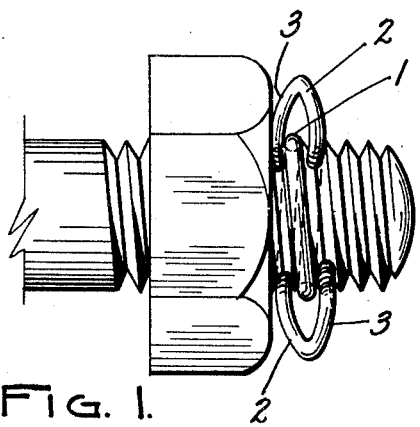
FIG. 1.
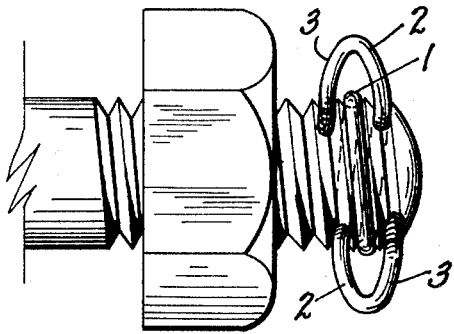
FIG. 2.
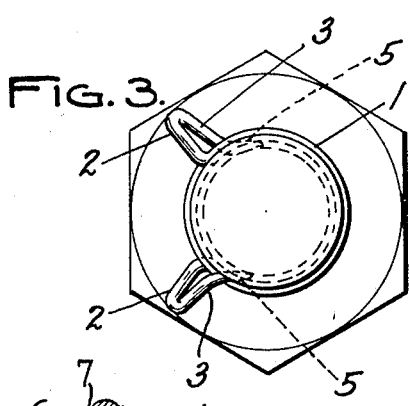
FIG. 3.
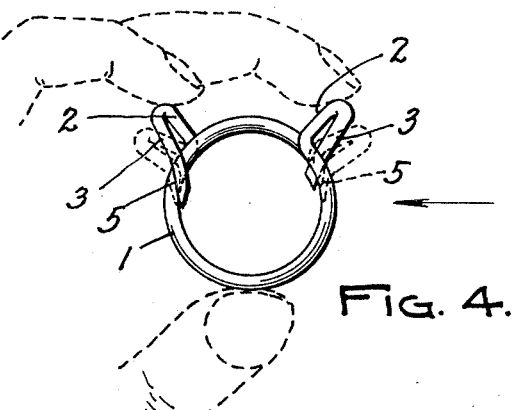
FIG. 4.
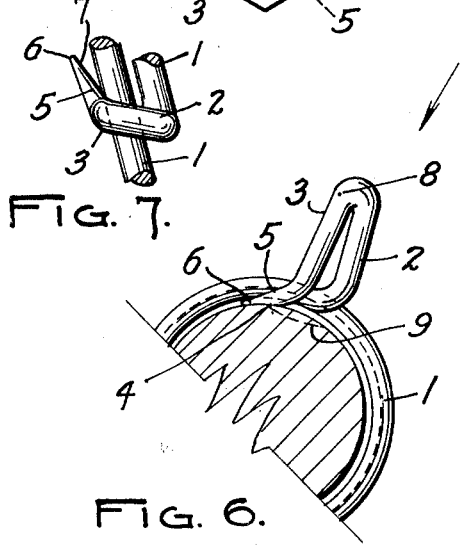
FIG. 7.
FIG. 5.
FIG. 6.
INVENTOR.
John A. Prussen
BY
Rolland S. Trott ATTORNEY.

Patented Dec. 3, 1929

1,738,482

UNITED STATES PATENT OFFICE

JOHN A. PRUSSEN, OF DENVER, COLORADO

NUT LOCK

Application filed May 5, 1928. Serial No. 275,375.

My invention relates to nut locks adapted to co-operate with screws or bolts and the nuts threaded thereon and thereby provide a lock against their relative movement with respect to each other.

The object of my invention is to provide a nut lock having two interchangeable and independent locking means whereby the nut will be locked by contact with either end of the nut lock.

A further object is to provide an interchangeable double ended nut lock which will require no special care or attention in its application since either end of the nut lock when contacting with the nut will lock same in place.

A further object is to provide an interchangeable double ended nut lock which will have one lock in operation and one lock in reserve and ready for use upon the breakage or disablement of the one in operation.

A further object is to provide such a double ended nut lock in which the lock in reserve provides an anchor effect to increase the effectiveness of the lock contacting with the nut.

A further object is to provide in a nut lock having both ends provided with a lock, a locking action having both an axial and a radial jamming effect.

A further object is to provide a nut lock which at least in the smaller sizes may be released by the thumb and two fingers of one hand.

A further object is to provide a nut lock which may be made of a single piece of wire formed and adapted to screw upon the threads of a screw or bolt and against the outer face of a nut threaded thereon, and provided with a lock adapted to contact against said nut and also provided with a second lock at the opposite end of the formed piece of wire, the two locks adapted to bottom in the thread of the screw or bolt and assist in guiding the nut lock as it is being screwed thereon.

The details of construction whereby the above objects are attained are described below and illustrated in the drawings, in which:—

Figure 1 is a side elevation of a nut threaded upon the threads of a screw or bolt and with my nut lock mounted thereon in engagement with the outer face of the nut.

Figure 2 is a view similar to Figure 1, but with the nut lock spaced from the outer face of the nut.

Figure 3 is an end view of Figure 1.

Figure 4 is an end view of my nut lock, the release position of the U-shaped handles and the two fingers and the thumb used in forcing the nut lock to the released position all being indicated by dotted lines.

Figure 5 is a side elevation of my nut lock.

Figure 6 is a fragmentary elevation of my nut lock showing a fragmentary section of the bolt upon which it is mounted.

Figure 7 is a fragmentary elevation of Figure 6, looking in the direction of the arrow.

My nut lock is to be made of any proper material, though for most purposes I believe tempered spring steel wire will be best.

The wire is wrapped to fit closely in the threads of the screw or bolt for which it is made, for substantially one and three quarters turns, forming what I call the thread portion 1, of my nut lock.

At each end of the thread portion 1, the wire is first bent outward in a radial direction, forming what I call an outward radial portion 2, and is then bent again but in an axial direction, and is then bent again but in an inward radial direction, forming what I call an inward radial portion 3, the outward and the inward radial portions combining to form what I call a U-shaped handle whose plane is roughly axial in extent.

The end of the inward radial portion forming the free leg of the U-shaped handle is adapted when not in place on a screw or bolt, to extend slightly inward from the inner circular face of the threaded portion I, as shown slightly exaggerated, at 4 of Figure 6.

Thus when the nut lock is put in place on a screw or bolt, the free leg of each U-shaped handle contacts firmly in the root of the thread on the opposite face of the nut lock from its end of the threaded portion 1, as shown in Figure 7.

The free leg of either U-shaped handle which is adjacent the nut acts to contact with the nut.

For this purpose it is formed into a wedge 5, which is shown best in Figures 6 and 7.

As the nut contacts with the adjacent face of this wedge 5, the point 6 of the wedge tends to slightly enter the threads of the nut, forming a positive contact therewith.

Further movement of the nut results in the following compound jamming action.

The axial component of the movement of the nut tends to jam the side 7 of the wedge 5 (see Figure 7) against the adjacent side of the thread of the screw or bolt upon which the nut is mounted. A slight exaggeration of this effect will be seen by a comparison of Figures 1 and 2.

The rotation of the nut tends to back up the wedge 5 along the threads of the screw or bolt. This movement tends to wrap the thread portion 1 tightly upon the screw or bolt, the lagging end of the thread portion 1 being in a way anchored by the contact of the point 6 of the wedge 5 in the bottom of the thread.

When any slight possible play is thus removed, the thread portion 1 will be tightly wrapped in the threads giving a snubbing effect, and the leading end of the thread portion 1 will thus be held positively.

Further pressure of the nut tending to cause backward movement of the adjacent wedge 5 along the threads will result in a springing of the U-shaped handle whereby the inward radial portion 3 acts as if pivoted about a point as at 8, and the face of the wedge 5 contacting against the bottom of the thread of the screw or bolt will be jammed into the bottom of the thread as it tends to follow some such curve as indicated at 9.

This jamming action tends to make the thread of the nut ride still further up on the point 6 of the wedge 5, tending to still further increase the direct radial wedge action of the nut upon the point 6.

Thus my lock provides the axial wedging action, the wrapping or snubbing action, and the swinging jam action about the point 8, all combining to cause the point 6 of the wedge 5 to enter more firmly into the nut along its thread to force the face 7 of the wedge 5 against the side of the thread of the bolt or screw and to jam the portion 4 of the wedge 5 into the bottom of the thread of the bolt or screw and thus prevent further movement of the nut.

Since both the U-shaped handles are alike, and each is provided with a wedge 5, my nut lock is double ended and will operate with the same results no matter which end of it is placed next to the nut.

In releasing my nut lock the two handles are forced apart, which tends to unwrap the thread portion and permit the nut lock to be unscrewed from the screw or bolt upon which it is mounted.

This is illustrated by the dotted lines of Figure 4, indicating the two fingers upon the two handles, and the thumb under the thread portion 1, opposite the fingers.

When the nut lock is put in place the same spreading action of the handles may be used especially in starting the nut lock upon the thread. Generally however, pressing or tapping the leading handle will be sufficient to screw the nut lock upon the thread after it is once started.

In some of the larger sizes where the wire used is too stiff for manual release of the nut lock, the thread portion 1 may be made of nearly two complete turns so that the U-shaped handles will be close together and a screw driver or other instrument may then be used between them as a pry to unwrap the thread portion 1 slightly and thereby loosen its grasp upon the screw or bolt.

But, this is a variation that comes within the field of the manufacturer, and will be well understood by anyone versed in such matters. In fact a proper instrument could be used to spread the handles in the constructions illustrated, and so this slight variation is not shown in the drawings.

It will now be seen that all the objects sought are attained by my invention, and though I am aware of other slight variations which might be made in the construction, I consider them to be practically mechanical equivalents, so I do not wish to limit my protection to the exact constructions shown and described, but what I claim as new, and desire to protect by Letters Patent is as follows:—

1. In a nut lock adapted to screw upon a thread and comprising a single length of wire, a thread portion of substantially constant radius, the two ends of which are formed into outwardly extending substantially U-shaped handles extending axially in opposite directions each to the remote side of the thread portion and forming a leading and a lagging handle, the free leg of each U-shaped handle being at a slight angle from the radial of the thread portion and forming a thread fitting wedge of normally smaller radius than the thread portion whereby the wedge projects within the circle of the thread portion and whereby back pressure against the leading wedge will tend to swing it downward against the threads about a point in its handle as a center and to tighten the thread portion, and the tightening of the thread portion will swing the lagging wedge down against the thread about a point in its handle as a center.

2. In a nut lock adapted to screw upon a thread and comprising a single length of wire, a thread portion of more than one turn and of less than two turns of substantially constant radius, the two ends of which are formed into outwardly extending substantially U-shaped handles extending axially in opposite directions each to the remote side of the thread portion and forming a leading and a lagging handle each at a slight angle to the radial, the free leg of each U-shaped handle forming a thread fitting wedge of normally smaller radius than the thread portion whereby the wedge projects within the circle of the thread portion, the lagging wedge adapted to act as an anchor for the thread portion and backward pressure against the leading wedge tending to tighten the thread portion upon the thread and to swing each wedge down against the thread about a point in its handle as a center.

3. In a nut lock comprising a single length of wire, a thread portion, the two ends of which are formed into outwardly extending substantially U-shaped handles extending axially in opposite directions each to the remote side of the thread portion, the free leg of each U-shaped handle being at a slight angle from the radial of the thread portion, forming a thread fitting wedge normally extending inward radially from the inner diameter of said thread portion.

4. In a nut lock comprising a single length of wire, a thread portion of substantially constant radius, the two ends of which are formed into outwardly extending substantially U-shaped handles extending axially in opposite directions each to the remote side of the thread portion, the free leg of each U-shaped handle forming a thread fitting wedge of normally smaller radius than the thread portion whereby the wedge projects within the circle of the thread portion, the portion of each handle from its outermost point to the wedge being at a slight angle from the radial of the thread portion whereby swinging of the free leg of the handle toward the radial about said point will tend to further decrease the radius of the wedge and increase its pressure in the thread.

5. In a nut lock adapted to screw upon a thread and comprising a single length of wire, a thread portion of more than one turn and less than two turns of substantially constant radius, the two ends of which are formed into outwardly extending substantially U-shaped handles, whose free legs are slightly removed from the radial of the thread portion, and extending axially in opposite directions each to the remote side of the thread portion and forming a leading and a lagging handle, the free extremity of each U-shaped handle forming a thread fitting wedge of normally smaller radius and tighter fit than the thread portion, whereby the wedge projects within the circle of the thread portion, the lagging wedge adapted to act as an anchor for the thread portion and to increase the grip of said anchor by circular turning action about a point in its handle as a center as backward pressure against the leading wedge tightens the thread portion, such backward pressure adapted to also increase the grip of the leading wedge against the thread by turning action of the wedge about a point in its handle.

In testimony whereof I affix my signature.
JOHN A. PRUSSEN.